US007830965B2

(12) United States Patent
Homiller

(10) Patent No.: US 7,830,965 B2
(45) Date of Patent: Nov. 9, 2010

(54) MULTIMEDIA DISTRIBUTING AND/OR PLAYING SYSTEMS AND METHODS USING SEPARATE RESOLUTION-ENHANCING SUPPLEMENTAL DATA

(75) Inventor: Daniel P. Homiller, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 2066 days.

(21) Appl. No.: 10/757,247

(22) Filed: Jan. 14, 2004

(65) Prior Publication Data

US 2005/0165911 A1     Jul. 28, 2005

(51) Int. Cl.
*H04N 7/12* (2006.01)
(52) U.S. Cl. .............................. 375/240.26; 375/240.21
(58) Field of Classification Search ............ 375/240.26, 375/240.16, 240.22, 240.11; 348/563; 725/146; 358/1.2; 709/229; 370/468
See application file for complete search history.

(56) References Cited

U.S. PATENT DOCUMENTS

| | | | | |
|---|---|---|---|---|
| 5,629,866 A | * | 5/1997 | Carrubba et al. | 348/563 |
| 6,057,884 A | * | 5/2000 | Chen et al. | 375/240.16 |
| 6,266,817 B1 | * | 7/2001 | Chaddha | 725/146 |
| 6,564,262 B1 | | 5/2003 | Chaddha | |
| 6,637,031 B1 | * | 10/2003 | Chou | 725/87 |
| 6,639,943 B1 | * | 10/2003 | Radha et al. | 375/240.11 |
| 7,031,016 B1 | * | 4/2006 | Ohwa | 358/1.2 |
| 7,243,153 B2 | * | 7/2007 | McIntyre et al. | 709/229 |
| 2002/0051581 A1 | | 5/2002 | Takeuchi et al. | |
| 2004/0081198 A1 | * | 4/2004 | Gardner et al. | 370/468 |

FOREIGN PATENT DOCUMENTS

| | | |
|---|---|---|
| EP | 0 696 121 A1 | 2/1996 |
| EP | 1 217 841 A2 | 6/2002 |

OTHER PUBLICATIONS

"Notification of Transmittal of The International Search Report and the Written Opinion of the International Searching Authority, or the Declaration", "Written Opinion of the International Searching Authority" and "International Search Report", PCT/US2004/035321, Apr. 26, 2005.

* cited by examiner

*Primary Examiner*—Gims S Philippe
(74) *Attorney, Agent, or Firm*—Myers Bigel Sibley & Sibley

(57) ABSTRACT

Multimedia data having a first resolution is transmitted and supplemental data is separately transmitted. When combined with the multimedia data having a first resolution, the supplemental data provides the multimedia content at a second resolution that is higher than the first resolution. The multimedia data having a first resolution is received and the supplemental data is separately received. The multimedia data having a first resolution and the supplemental data are combined, to provide the multimedia content at a second resolution that is higher than the first resolution. The multimedia data having a first resolution may be transmitted, received and played using streaming, while the supplemental data may be transmitted, received and played by downloading. Digital rights management schemes may be applied to the multimedia data having a first resolution and/or to the supplemental data.

56 Claims, 10 Drawing Sheets

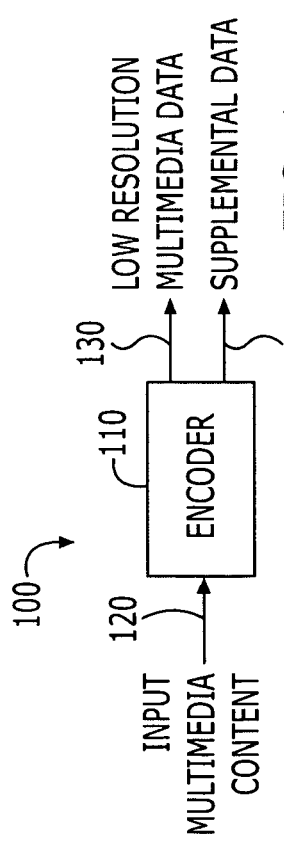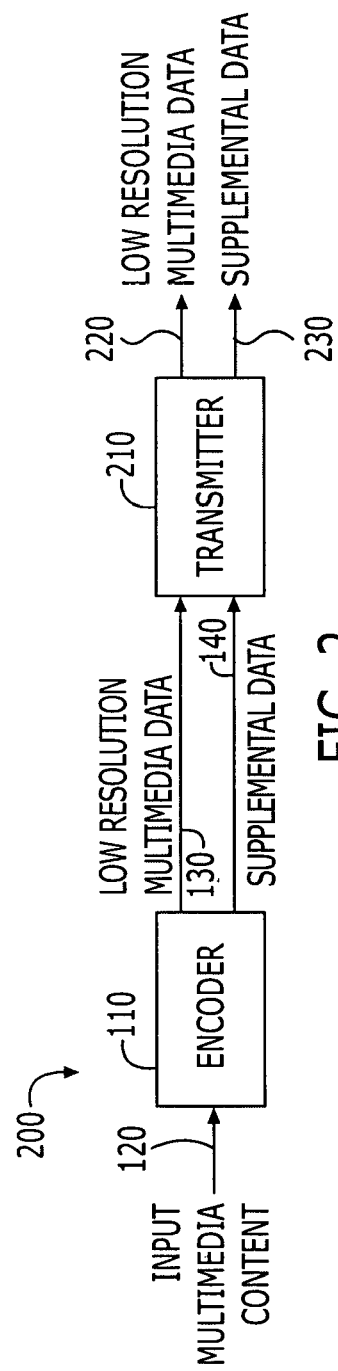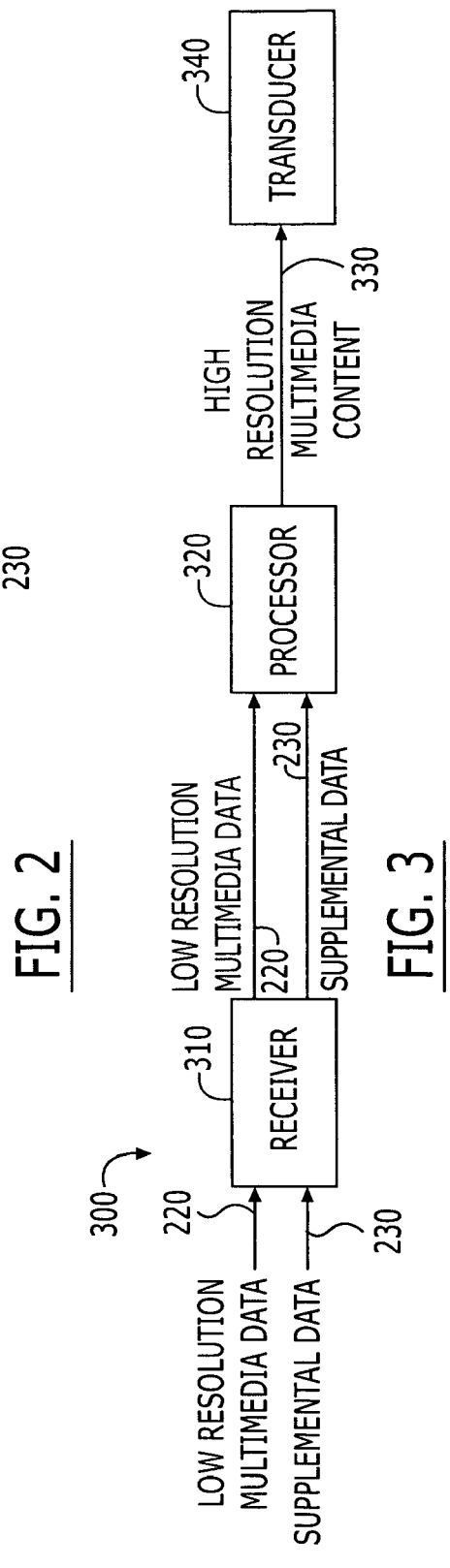

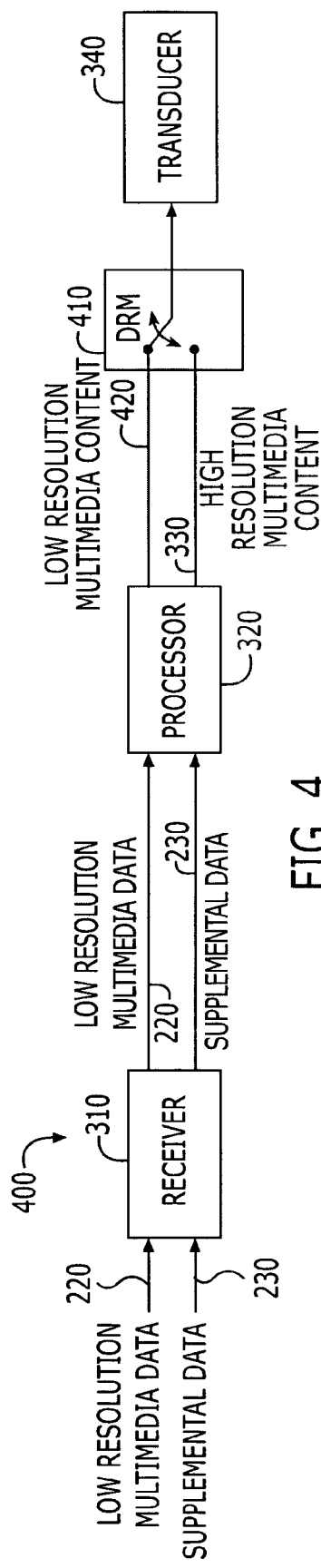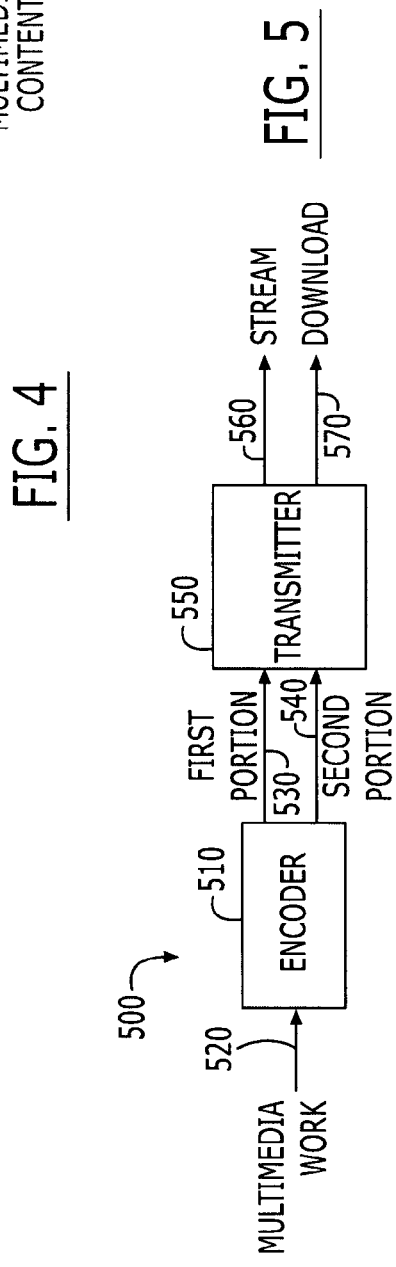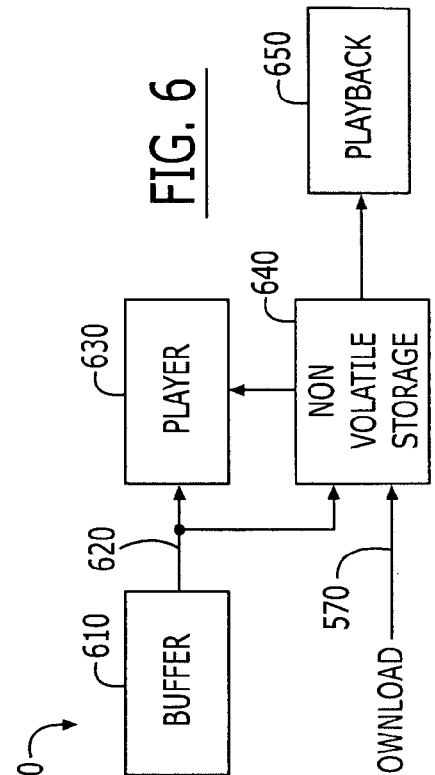

MULTIMEDIA DISTRIBUTING AND/OR PLAYING SYSTEMS AND METHODS USING SEPARATE RESOLUTION-ENHANCING SUPPLEMENTAL DATA

FIELD OF THE INVENTION

This invention relates to communications systems and methods, and more particularly to systems and methods for distributing and/or playing multimedia content.

BACKGROUND OF THE INVENTION

With the advent of large-scale wired and wireless communications networks, such as the Internet and cellular networks, the distribution of multimedia content over these networks may increase. As used herein, the term "multimedia" content includes analog or digital audio, analog or digital image and/or analog or digital video content.

There are generally two techniques for multimedia distribution over networks: streaming and downloading. In streaming, the multimedia content is sent to a user in a continuous stream, and is played as it arrives. In contrast, downloading transmits the data as a computer file, which is then stored at the user device and may be played back after the entire file is downloaded. Often, streaming may be limited in resolution due to potential bandwidth limitations of the network through which the streaming multimedia content is transmitted. However, real-time or near real-time playback may be provided. Downloaded multimedia content may be higher in resolution, but there may be a large playback latency time while the file is being downloaded.

SUMMARY OF THE INVENTION

Some embodiments of the present invention provide multimedia distributing methods wherein multimedia data having a first resolution is transmitted, and supplemental data is separately transmitted. In some embodiments, the separately transmitted supplemental data is at least partially separated from the multimedia data having a first resolution in transmission time, space, channel and/or medium. When combined with the multimedia data having a first resolution, the supplemental data provides multimedia content at a second resolution that is higher than the first resolution.

Multimedia playing methods according to some embodiments of the present invention receive the multimedia data having a first resolution, and may play the multimedia data at the first resolution. The supplemental data is also separately received. The multimedia data having a first resolution and the supplemental data are combined to provide the multimedia content at a second resolution that is higher than the first resolution. The multimedia content at the second resolution may be played as well.

Some embodiments of the present invention can allow multimedia data having a first resolution to be transmitted, received and played, for example using streaming. The supplemental data can be transmitted, for example by downloading, and combined with the multimedia data having a first resolution to provide multimedia content at a second resolution that is higher than the first resolution.

Many techniques for separately transmitting the multimedia data having a first resolution and the supplemental data may be provided according to various embodiments of the invention. In particular, in some embodiments of the present invention, the multimedia data having a first resolution and the supplemental data may be transmitted during offset and/or at least partially overlapping time intervals. In some embodiments, the multimedia data having a first resolution may be transmitted in real-time or near real-time, and the supplemental data is not transmitted in real-time or near real-time. In some embodiments, the multimedia data having a first resolution and the supplemental data are transmitted from different multimedia servers. However, in other embodiments, the same server may be used. Similarly, in some embodiments, the multimedia data having a first resolution and the supplemental data may be transmitted using different transmission channels such as different networks, carrier frequencies, time slots and/or spreading codes. However, in other embodiments, the same channel may be used. In still other embodiments, the multimedia data having a first resolution and/or supplemental data may be transmitted using separate physical media, such as magnetic and/or optical disks and/or solid state memory modules. However, in other embodiments, the same media may be used. Moreover, in some embodiments, the multimedia content having a first resolution may be subject to a first digital rights management scheme and the supplemental data may be subject to a second digital rights management scheme that is different from the first digital rights management scheme.

It will be understood by those having skill in the art that, as used herein, the first resolution and the second resolution that is higher than the first resolution may be defined in terms of sampling frequency, compression ratio, frequency range, number of bits, distortion levels, number of pixels, frame rate, number of colors, coding rates, number of channels and/or other parameters. The differences in resolution may generally provide differences in quality of the multimedia content that is played. It will also be understood that embodiments of the present invention have been described above primarily with respect to multimedia distributing methods and multimedia playing methods. However, multimedia distributing systems and multimedia playing systems also may be provided according to various embodiments of the present invention.

BRIEF DESCRIPTION OF THE DRAWINGS

FIGS. 1-9 are block diagrams of multimedia distributing and/or playing methods and/or systems according to various embodiments of the present invention.

DETAILED DESCRIPTION

Figure 7:
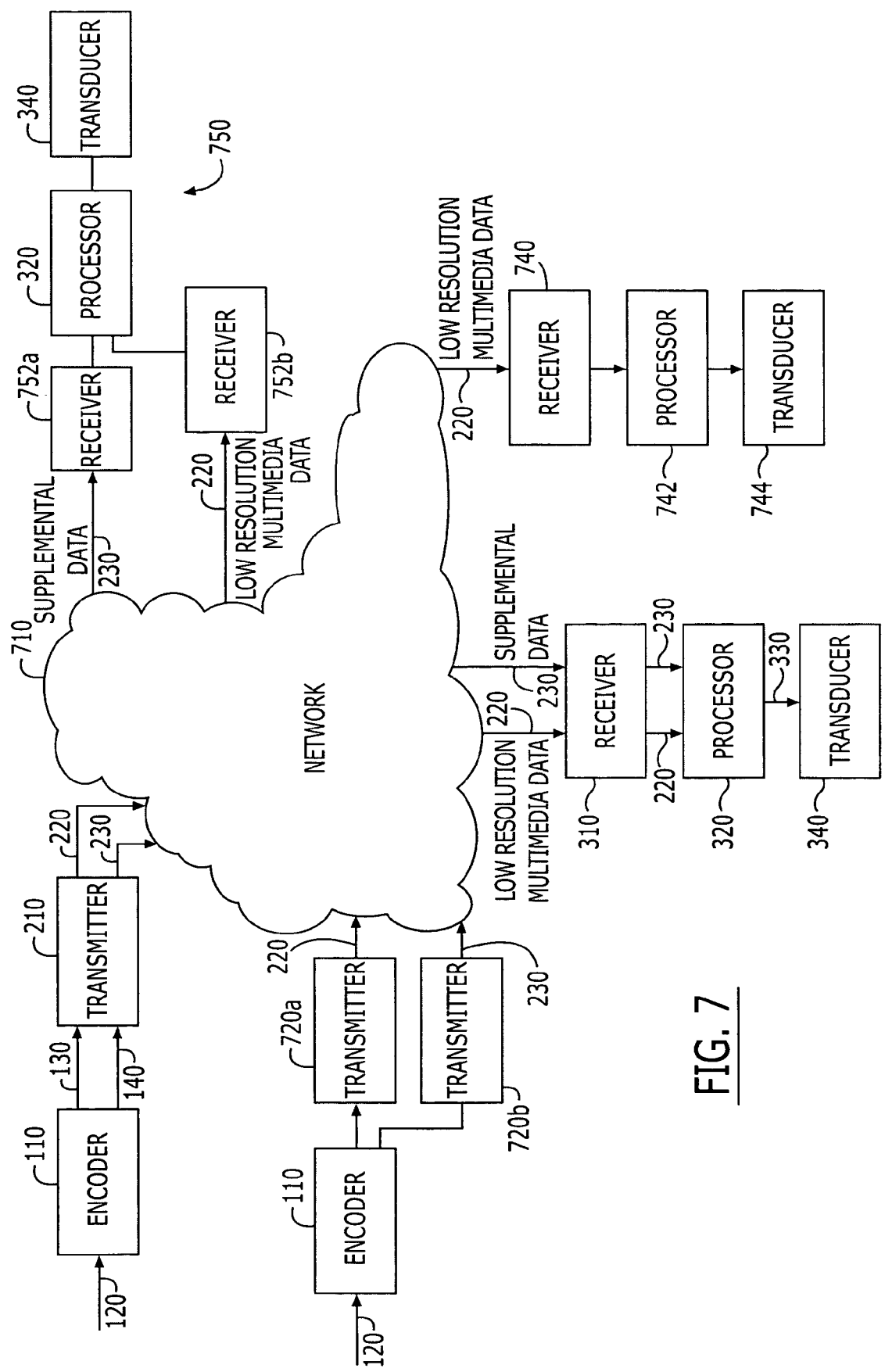

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The present invention is described below with reference to block diagrams and/or flowchart illustrations of methods, apparatus (systems) and/or computer program products according to embodiments of the invention. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

As will be appreciated by one of skill in the art, the present invention may be embodied as a method, data processing system and/or computer program product. Thus, the present invention may take the form of an entirely hardware embodiment, an entirely software embodiment or an embodiment combining software and hardware aspects, which may be collectively referred to herein as a "circuit" or "module".

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

FIG. 1 is a block diagram of multimedia distributing systems and/or methods according to various embodiments of the present invention. As shown in FIG. 1, these multimedia distributing systems and/or methods 100 include an encoder 110 that is responsive to input multimedia content 120. The input multimedia content 120 may take a variety of forms, including analog and/or digital signals. Moreover, the encoder can include analog-to-digital connectors, digital-to-digital converters, coders, transcoders, compressors, sorters, parsers and/or other conventional components. The encoder 110 is configured to encode the input multimedia content 120 at a first resolution, to provide encoded multimedia content at the first resolution, also referred to herein as low resolution multimedia data 130. The encoder 110 is also configured to separately generate supplemental data 140, which, when combined with the low resolution multimedia data 130, provides the input multimedia content at a second resolution that is higher than the first resolution. It will be understood that as used herein, the term "combined" means that the low resolution multimedia/data and the supplemental data are both used to generate the high resolution multimedia content, and excludes merely replacing the low resolution content with the high resolution content. Moreover, multiple supplemental data may be provided, according to embodiments of the invention, to provide different resolution levels.

In some embodiments, "separately" designates at least partially separated in time, space, channel (including carrier or subcarrier frequency, time slot and/or spreading code) and/or medium. In some embodiments, the first resolution comprises a first sampling frequency, a first compression ratio, a first frequency range, a first number of bits of resolution, a first distortion level, a first number of pixels; a first frame rate, a first number of colors, a first number of channels and/or a first coding rate. The second resolution comprises, respectively, a second sampling frequency that is higher than the first sampling frequency, a second compression ratio that is lower than the first compression ratio, a second frequency range that is wider than the first frequency range, a second number of bits of resolution that is greater than the first number of bits of resolution, a second distortion level that is lower than the first distortion level, a second number of pixels that is greater than the first number of pixels, a second frame rate that is greater than the first frame rate, a second number of colors that is greater than the first number of colors, a second number of channels that is greater than the first number of channels and/or a second coding rate that is higher than the first coding rate. It also will be understood that the low resolution multimedia data 130 and the supplemental data 140 need not be generated separately by the encoder 110 in some embodiments of the invention, if they are transmitted separately by a transmitter, as described in connection with FIG. 2.

FIG. 2 is a block diagram of other multimedia distribution systems and/or methods according to other embodiments of the present invention. As shown in FIG. 2, these systems and/or methods further include a transmitter 210 that is responsive to the encoder 110. The transmitter 210 is configured to separately transmit the low resolution multimedia data 220 and the supplemental data 230. As was described above, the low resolution multimedia data 130 and the supplemental data 140 may be generated separately by the encoder 110, or generated together by the encoder 110, but transmitted separately by the transmitter 210. In some embodiments, the low resolution multimedia data 220 is transmitted by streaming the low resolution multimedia data 220 and the supplemental data 230 is transmitted by downloading the supplemental data. In other embodiments, however, both the low resolution multimedia data 220 and the supplemental data 230 may be downloaded and/or streamed.

It also will be understood by those having skill in the art that the term "transmitter" is used herein to generically refer to any transmission system and/or method for multimedia data between two separate devices, including wireless, wired and/or distribution of physical media. In some embodiments, the low resolution multimedia data 220 and the supplemental data 230 are transmitted using the same multimedia server and transmission channel, but offset in time. However, in other embodiments, different multimedia servers and/or transmission channels may be used for simultaneous or overlapping transmissions. Thus, for example, in some embodiments, the low resolution multimedia data 220 is streamed from a streaming server via a wire and/or wireless network, whereas the supplemental data is downloaded from a downloading server via a wire and/or wireless network. In still other embodiments, the low resolution multimedia data 220 may be transmitted by streaming, and the supplemental data 230 may be transmitted on a physical media, such as a magnetic, optical and/or solid state nonvolatile memory device. In still other embodiments, the low resolution multimedia data 220 is transmitted in real-time or near real-time, and the supplemental data 230 is not transmitted in real-time or near real-time. However, in other embodiments, the separate transmission of the encoded multimedia data 220 and the supplemental data 230 may be performed simultaneously, in overlapping time periods or in non-overlapping time periods. In some embodiments, the low resolution multimedia data 220 is transmitted prior to the supplemental data 230. However, in other embodiments, the supplemental data 230 may be transmitted simultaneously with or prior to the low resolution multimedia data 220.

FIG. 3 is a block diagram of multimedia playing systems and/or methods according to various embodiments of the present invention. As used herein, the term "playing" includes playing of audio and/or displaying of video. More specifically, as shown in FIG. 3, these multimedia playing systems and/or methods 300 include a receiver 310 that is configured to separately receive the low resolution multimedia data 220 and the supplemental data 230. A processor 320 is configured to combine the low resolution multimedia data 220 and the supplemental data 230, to provide multimedia content at a second resolution that is higher than the first resolution, also referred to as high resolution multimedia content 330. It will be understood by those having skill in the art that the processor 320 may be embodied by general purpose hardware, special purpose and/or software, and can include one or more Digital Signal Processors (DSP) and/or coder/decoders (CO-DEC). A multimedia transducer 340, which may include a display(s) and/or loudspeaker(s), is configured to play back the multimedia content at the second resolution that is higher than the first resolution. The transducer 340 also may include a processor and/or be functionally combined with the processor 320.

FIG. 4 is a block diagram of multimedia playing systems and/or methods according to other embodiments of the present invention. As shown in FIG. 4, these systems and/or methods 400 include a receiver 310, a processor 320 and a transducer 340, as were described above in connection with FIG. 3. In embodiments of the present invention that are illustrated in FIG. 4, both low resolution multimedia content 420 and the high resolution multimedia content 330 are available for playing via the multimedia transducer 340 using a switch 410. Thus, the multimedia transducer 340 is configured to play the low resolution multimedia content 420, or the high resolution multimedia content 330. It will be understood by those having skill in the art that the switch 410 may be embodied using hardware and/or software.

In some embodiments, the switch 410 may be controlled under user control. However, in other embodiments of the present invention, as will be described below, digital rights management systems and/or methods also may be used at least partially to control the switch 410. Thus, in some embodiments of the present invention, the low resolution multimedia data 420 may be subject to a first digital rights management scheme and the high resolution multimedia content 330 may be subject to a second digital rights management scheme that is different from the first digital rights management scheme. In some embodiments, the first digital rights management scheme may allow free (no fee) streaming audio and/or video at the first resolution, but may only allow the supplemental data to be downloaded, upon payment of a prescribed fee. Accordingly, users may pay fees or additional fees to play the high resolution multimedia content.

FIG. 5 is a block diagram of systems and/or methods for multimedia distributing according to yet other embodiments of the present invention. As shown in FIG. 5, these systems and/or methods 500 include an encoder 510 that is responsive to a multimedia work 520. The encoder 510 is configured to generate a first portion 530 of the multimedia work 520 and a second portion 540 of the multimedia work 520, where neither portion includes the entire multimedia work. In other words, the first and second portions together comprise the multimedia work. A transmitter 550 is configured to stream a first portion of the multimedia work and to download a second portion of the multimedia work, to produce a stream 560 and a download 570, respectively. The transmitter 550 may include one or more streaming servers and one or more downloading servers. In some embodiments, the first portion 530 may correspond to the low resolution multimedia data 130 of FIGS. 1-2, and the second portion 540 may correspond to the supplemental data 140 of FIGS. 1 and 2.

FIG. 6 is a block diagram of systems and/or methods for playing multimedia content according to some embodiments of the present invention. As shown in FIG. 6, a received stream 560 may be buffered in a buffer 610, and the buffered stream 620 may be provided to a player 630 for playing streaming multimedia. The downloaded data 570 may be stored in nonvolatile storage 640 and combined with streamed data 620, which is provided to a playback system 650. In some embodiments, the player 630 and playback system 650 may share at least one component. In other embodiments, they may not share components.

FIG. 7 is a block diagram of systems and/or methods for transmitting and/or playing multimedia data according to various embodiments of the present invention. FIG. 7 conceptually illustrates how various transmitting and playing systems may be linked via one or more networks 710, which may be wired and/or wireless, public and/or private network, including the Internet and/or cellular networks. To distribute multimedia content, an encoder 110 may be responsive to input multimedia content 120, to generate low resolution multimedia data 130 and supplemental data 140, as was described, for example, in connection with FIGS. 1 and/or 2 above. A transmitter 210 is responsive to the low resolution multimedia data 130 and the supplemental data 140, to separately transmit the low resolution multimedia data 220 and the supplemental data 230 over the network 710, as was also described, for example, in connection with FIGS. 1 and/or 2. As also shown in FIG. 7, in other embodiments, the transmitter may be provided in two portions, 720*a* and 720*b*, wherein the first portion 720*a* transmits the low resolution multimedia data 220 and the second portion 720*b* transmits the supplemental data 230. For example, in some embodiments, the encoded low resolution multimedia data 130 may be transmitted as streaming multimedia and the first transmitter 720*a* may be embodied as a streaming server. The supplemental data may be transmitted as a download, wherein the second transmitter 720*b* may be embodied as a download server.

Still referring to FIG. 7, at the receiving end, a single receiver 310 may receive both the low resolution multimedia data 220 and the supplemental data 230, and allow playing of the low resolution multimedia content and/or high resolution multimedia content as was described, for example, in FIGS. 3 and/or 4 above. Other receivers 740 may be configured to only receive the low resolution multimedia data 220, to process this data via a processor 742 and to play the data via a transducer 744. Still other embodiments may include a receiver that is configured in two portions 752*a*, 752*b*, one of which receives the supplemental data 230 and the other of which receives the low resolution multimedia data 220. A processor 320 and transducer 340 may be provided, as was described above.

Figure 8:
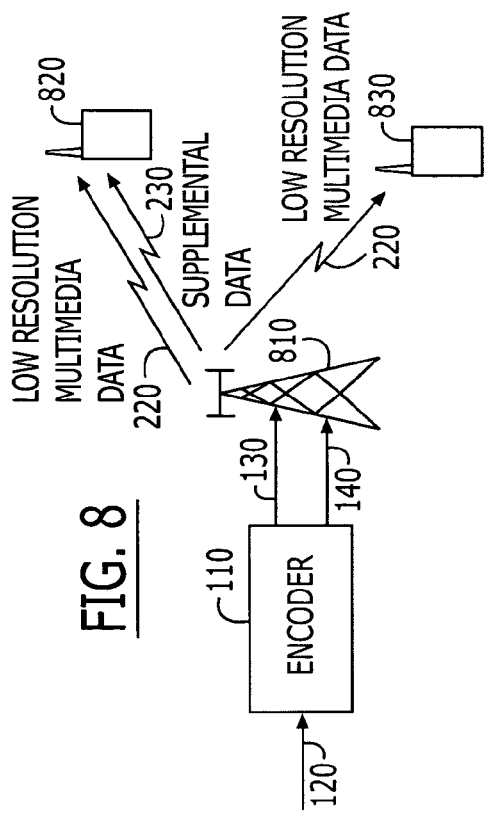

FIG. 8 is a block diagram of multimedia distribution and playback methods and systems according to other embodiments of the present invention. In these embodiments, an encoder 110 may be used as was described in the above figures, and the low resolution multimedia data 220 and the supplemental data 230 are separately transmitted from a wireless transmitter, which may be embodied as one or more cellular and/or satellite base stations 810. Separate transmissions may employ separate times, channels, time slots, spreading codes, etc. Some user devices 820 may be configured to receive both the encoded low resolution multimedia data 220 and the supplemental data 230, so as to allow, for example, real-time or near real-time playback of the multimedia content at the first resolution and deferred playback of the multimedia content at the second resolution. Other user devices 830 may be configured to only receive the low resolution multimedia data 220.

In some embodiments, the user devices 820/830 may include digital rights management systems to govern which content they are capable of receiving. In other embodiments, the transmitter 810 may selectively transmit the data streams based on the telephone number, IP address and/or other identifier of the user device 820 or 830. It will be understood by those having skill in the art that the wireless user devices 820 or 830 may be embodied as multimedia players, cellular and/or satellite radiotelephones, Personal Communications System (PCS) terminals that may combine a cellular radiotelephone with data processing, facsimile and/or data communications capabilities, Personal Digital Assistants (PDA) that can include a radio frequency transceiver and a pager, Internet/intranet access, Web browser, organizer, calendar and/or a global positioning system (GPS) receiver, and/or conventional laptop and/or palmtop computers or other appliances, which include a radio frequency receiver.

Figure 9:
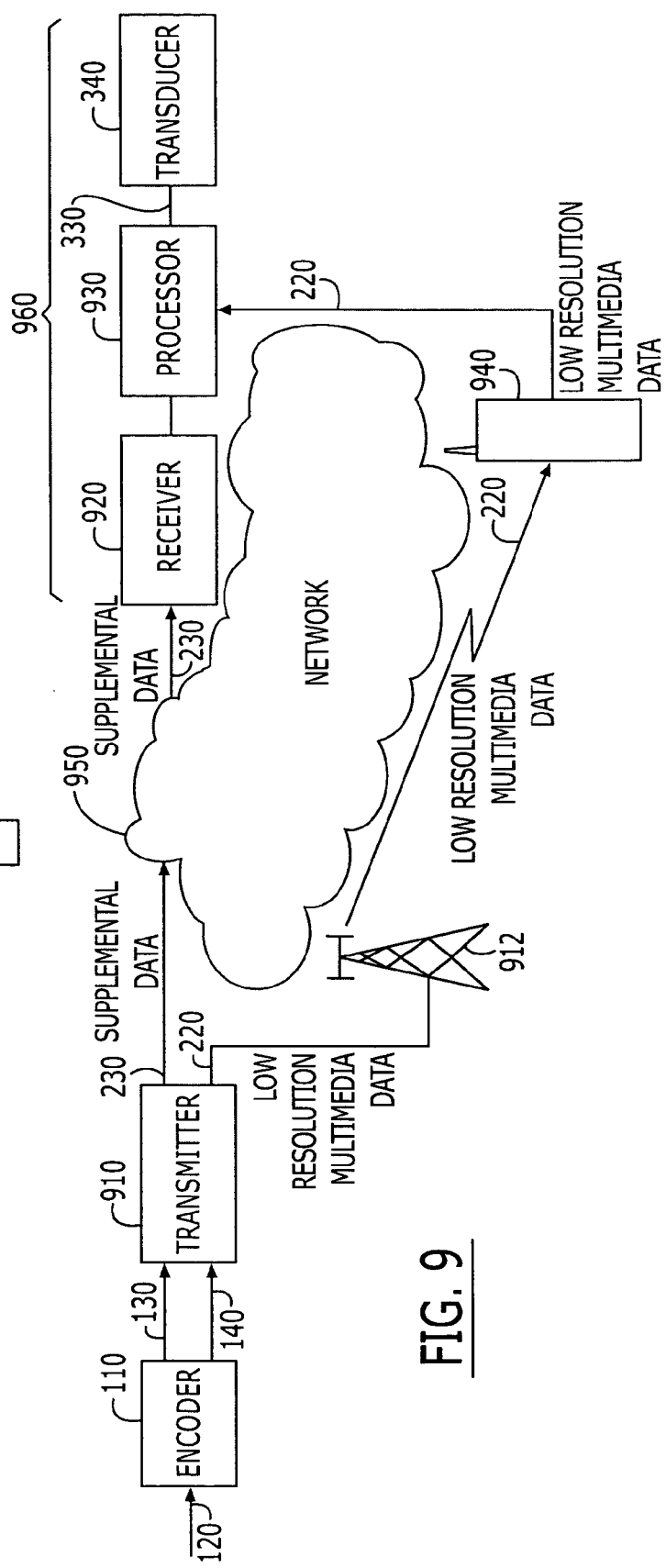

FIG. 9 is a block diagram of other multimedia distributing and playing systems and methods according to other embodiments of the present invention. In these embodiments, an encoder 110 and a transmitter 910 are provided. The low resolution multimedia data 220 is wirelessly transmitted to wireless user devices 940 using a wireless transmitter 912 so that, in some embodiments, streaming multimedia may be provided at the wireless user devices 940. The supplemental data 230 is transmitted over a wire network 950 to a wire receiver 920 such as a home media server. A processor 930 may combine the encoded low resolution multimedia data 220 and the supplemental data 230 to produce the high resolution multimedia content 330 for playback at a transducer 340. It will be understood that the low resolution multimedia data 220 may be provided to the processor 930 from the wireless user device 940, for example using wired and/or wireless transmissions therebetween, in some embodiments. In other embodiments, the low resolution data also may also be provided via the network 950. Thus, in embodiments of FIG. 9, low resolution multimedia content may be played at a wireless user device 940, whereas high resolution multimedia content may be played at a wired user device 960.

It will be understood by those having skill in the art that combinations and subcombinations of the block diagrams of FIGS. 1-9 also may be provided according to various embodiments of the present invention, as defined by the claims.

FIGS. 10-16 are flowcharts of operations that may be performed for multimedia distributing and/or multimedia playing according to various embodiments of the invention. These embodiments may be performed, for example, using the block diagrams of FIGS. 1-9.

Figure 10:
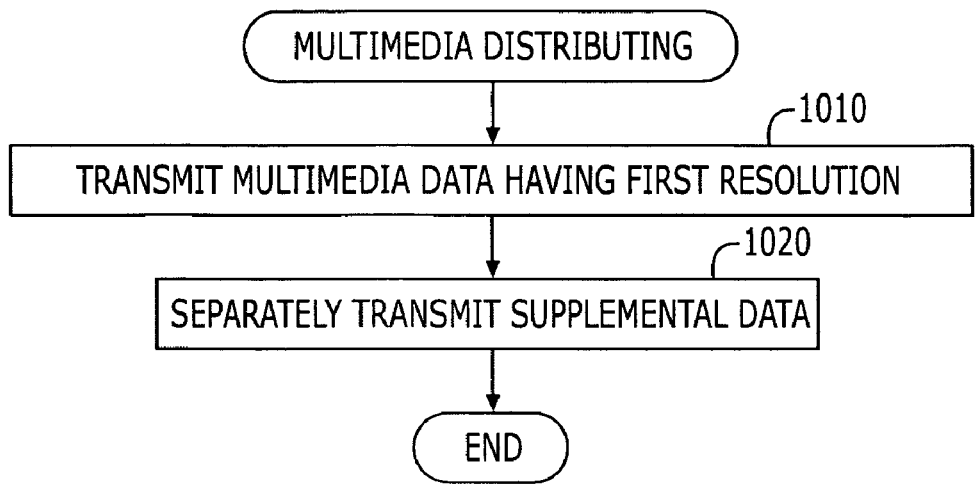
FIGS. 10-18 are flowcharts of operations that may be performed to distribute and/or play multimedia content according to various embodiments of the present invention.

Referring to FIG. 10, operations for multimedia distributing, according to some embodiments of the present invention, are illustrated. As shown in FIG. 10, at Block 1010, multimedia data having a first resolution is transmitted. At Block 1020, supplemental data which, when combined with the multimedia data having a first resolution, provides multimedia content at a second resolution that is higher than the first resolution, is separately transmitted. It will be understood that, in some embodiments, the operations of Block 1010 are performed prior to the operations of Block 1020. In other embodiments, the operations of Block 1020 may be performed, at least in part, prior to the operations of Block 1010. In other embodiments, operations of Blocks 1010 and 1020 may overlap, at least in part, in time.

Figure 11:
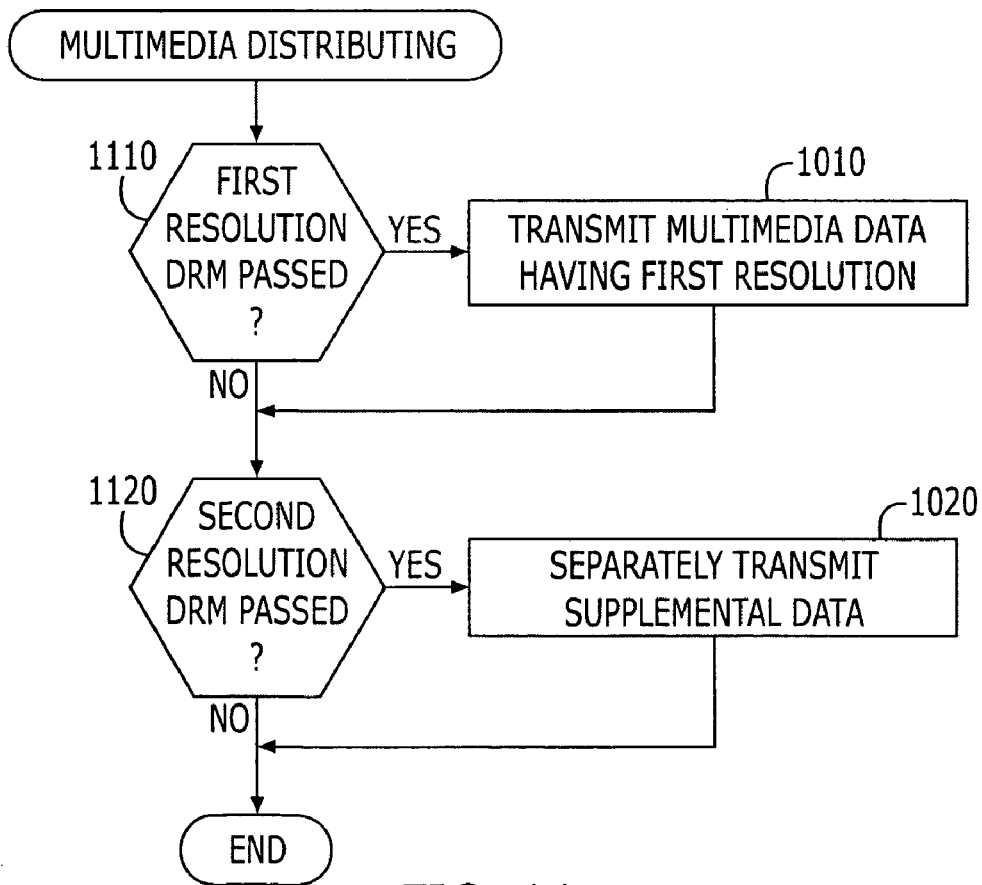

FIG. 11 is a flowchart of operations that may be performed for multimedia distributing according to other embodiments of the present invention, wherein digital rights management standards are used to control the operations of Blocks 1010 and 1020. In particular, the transmission of multimedia data of Block 1010 is subject to a first Digital Rights Management (DRM) scheme at Block 1110. In some embodiments of the present invention, a first payment may be received prior to transmitting the multimedia content having the first resolution. In other embodiments, the first resolution DRM may allow free transmission of the low resolution multimedia content.

Still referring to FIG. 1, the transmission of supplemental data at Block 1020 is subject to a second DRM scheme at Block 1120, which is different from the first DRM scheme of Block 1110. Thus, in some embodiments, a payment or a second payment may be obtained prior to transmitting the supplemental data. It will be understood by those having skill in the art that the operations of Blocks 1110 and 1120 may be performed out of the sequence shown and may be, in fact, performed simultaneously using separate sources, channels, media, etc. Thus, the low (first) resolution multimedia content may be obtained based on a first DRM scheme, whereas the higher resolution content may be obtained based on a second DRM scheme.

Figure 12:
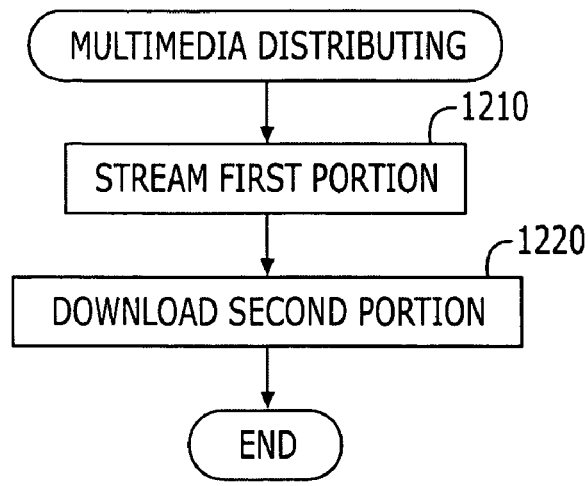

FIG. 12 is a flowchart of operations that may be performed to distribute multimedia content according to other embodiments of the invention. Referring to FIG. 12, at Block 1210, a multimedia work is transmitted by streaming a first portion of the multimedia work. At Block 1220, a second portion of the multimedia work is downloaded. It will be understood by those having skill in the art that the operations of Blocks 1210 and 1220 may occur in reverse order and may, at least in part, overlap in time. Moreover, in some embodiments, the operations of Block 1210 may transmit multimedia data having a first resolution, as described at Block 1010, and the operations of Block 1220 may transmit supplemental data, as described in Block 1020.

Figure 13:
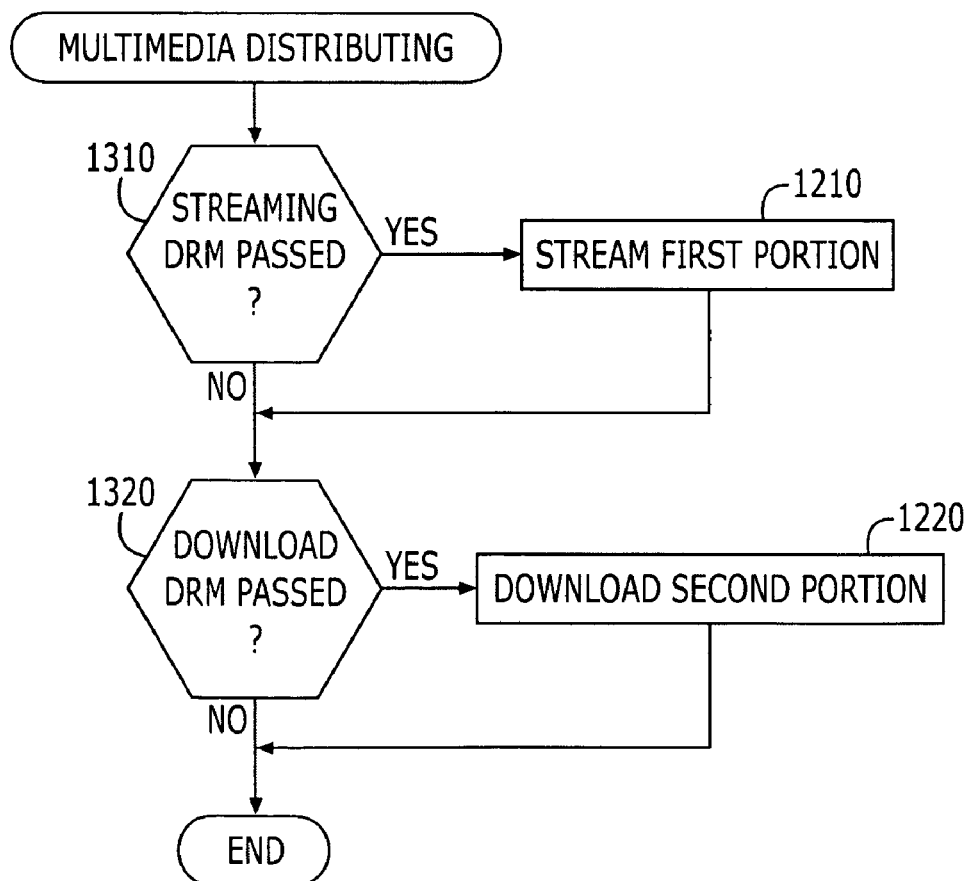

FIG. 13 is a flowchart of operations for distributing multimedia data which allows DRM to be used. Thus, in FIG. 13, the operations of Block 1210 may be performed if a streaming DRM is passed at Block 1310. If the DRM fails, these operations are not performed. Moreover, the operations of Block 1220 are performed if a download DRM is passed at Block 1320. If the DRM fails, these operations are not performed. Accordingly, different DRM systems may be used for the streaming and for the downloading. It will be understood that the operations of Blocks 1110, 1120, 1310 and/or 1320 may be performed at the encoder, transmitter, user device and/or other DRM device in various embodiments of the present invention, based on the particular DRM system that is used.

Figure 14:
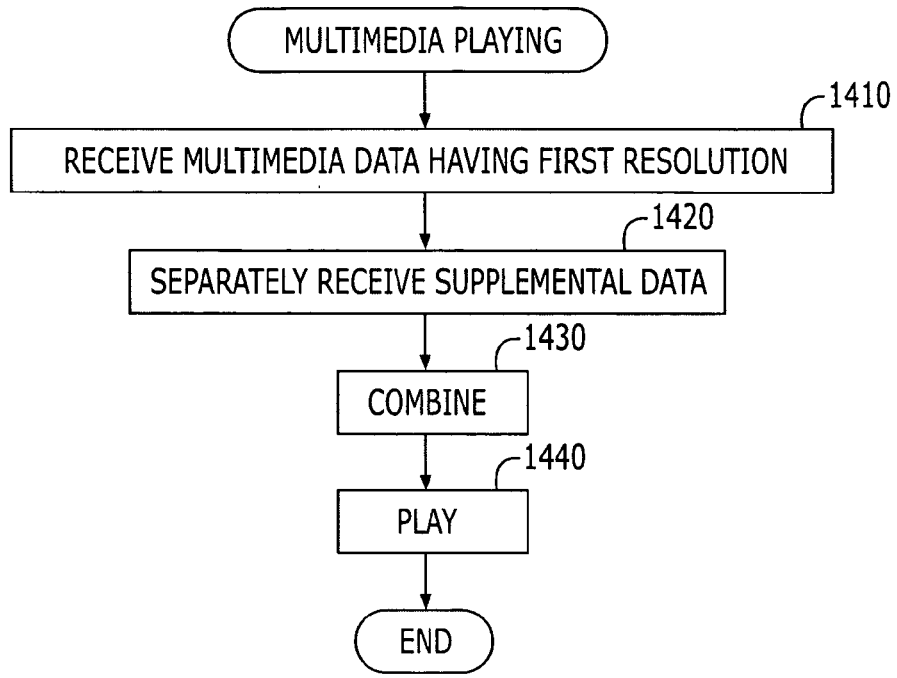

FIG. 14 is a flowchart of operations that may be performed for multimedia playing according to various embodiments of the present invention. As shown at Block 1410, multimedia data having a first resolution is received. At Block 1420, supplemental data is separately received. It will be understood that the operations of Blocks 1410 and 1420 may be performed out of the order shown and/or may overlap, at least in part, in time. At Block 1430, the multimedia data having a first resolution and the supplemental date are combined to provide the multimedia content at a second resolution that is higher than the first resolution. Finally, at Block 1440, the multimedia content at a second resolution is played.

Figure 15:
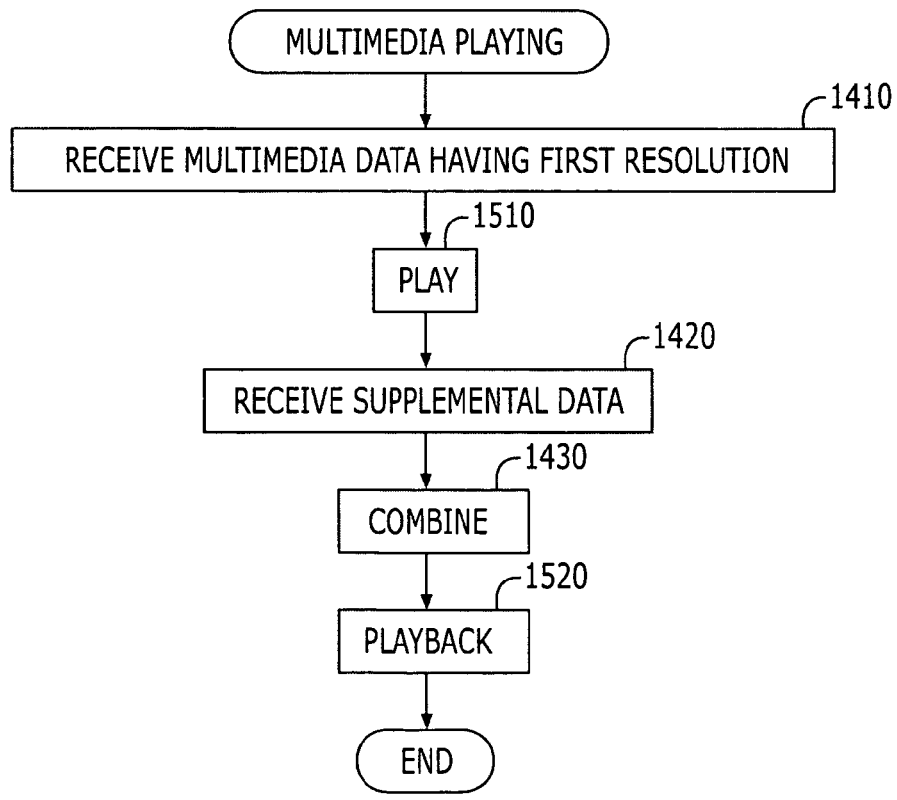

FIG. 15 is a flowchart of other operations for multimedia playing according to other embodiments of the present invention. Operations of FIG. 15 differ from operations of FIG. 14, in that after receiving the multimedia data having the first resolution at Block 1410, the multimedia data may be played at the first resolution at Block 1510. Operations of Blocks 1420, 1430 and 1520 also may be performed to provide playback of the multimedia content at a second resolution that is higher than the first resolution. It will be understood that the terms "play" and "playback" may be used to distinguish those embodiments in which operations of Block 1410 correspond to streaming, whereas operations of Block 1520 correspond to downloading. However, in other embodiments, the same operations may be performed at Blocks 1510 and 1520, to play the respective multimedia content having a first resolution or the multimedia content having the second resolution that is higher than the first resolution.

Figure 16:
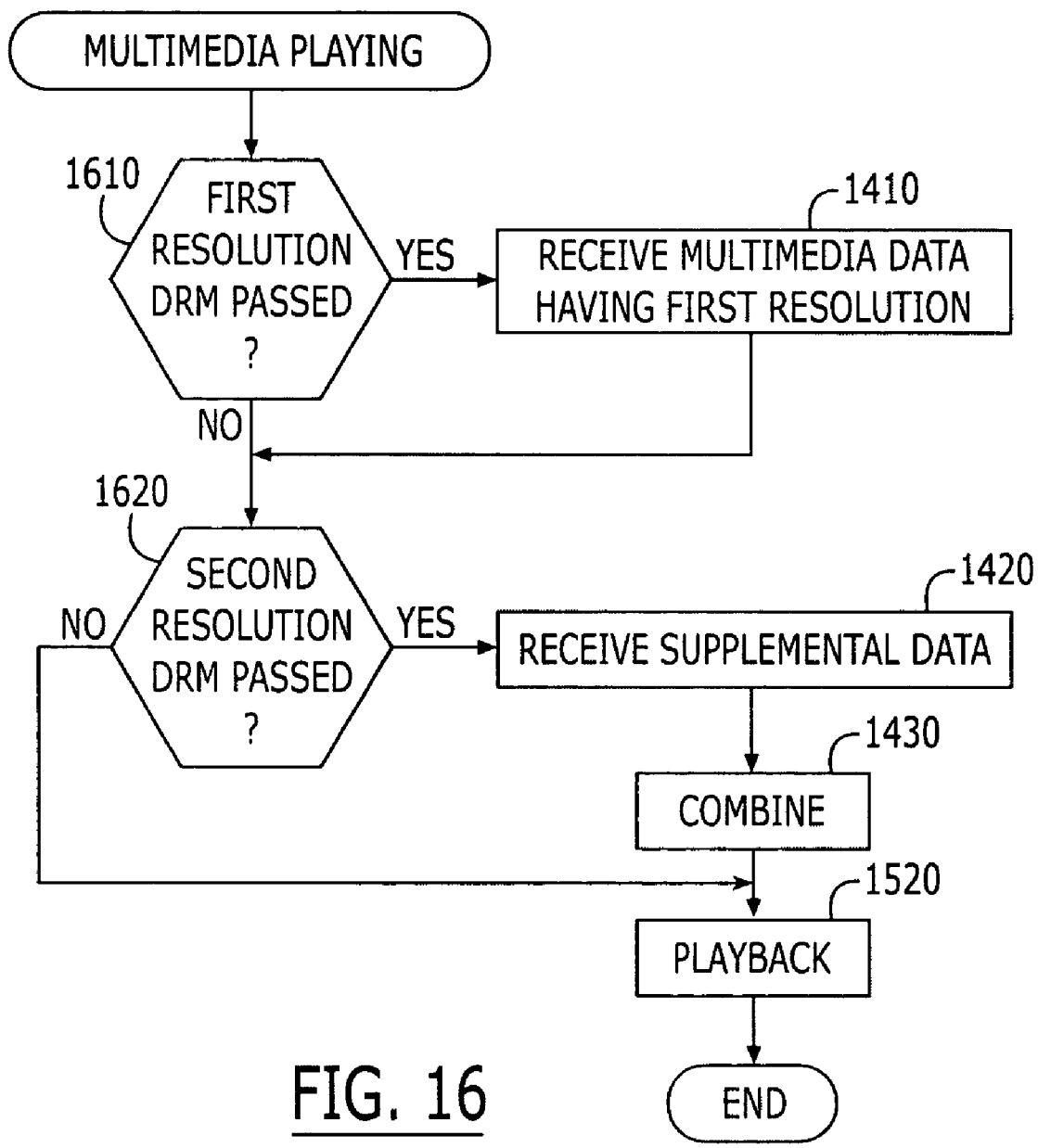

FIG. 16 illustrates other embodiments of the present invention in which DRM is used to govern the receipt and/or playing of the multimedia content having a first resolution and/or the multimedia content having the second resolution. Thus, in FIG. 16, operations of Block 1410 are performed upon a first DRM being passed at Block 1610. If the DRM fails, these operations are not performed. Moreover, operations of Block 1420 are performed upon passing a second DRM at Block 1620. If the DRM fails, these operations are not performed. Accordingly, embodiments of the present invention can allow the transmission and/or receipt of multimedia content to be governed differently for low resolution and high resolution versions thereof. Varying transmission channel bandwidths, user desires to pay for quality, and/or DRM schemes may thereby be accommodated.

Figure 17:
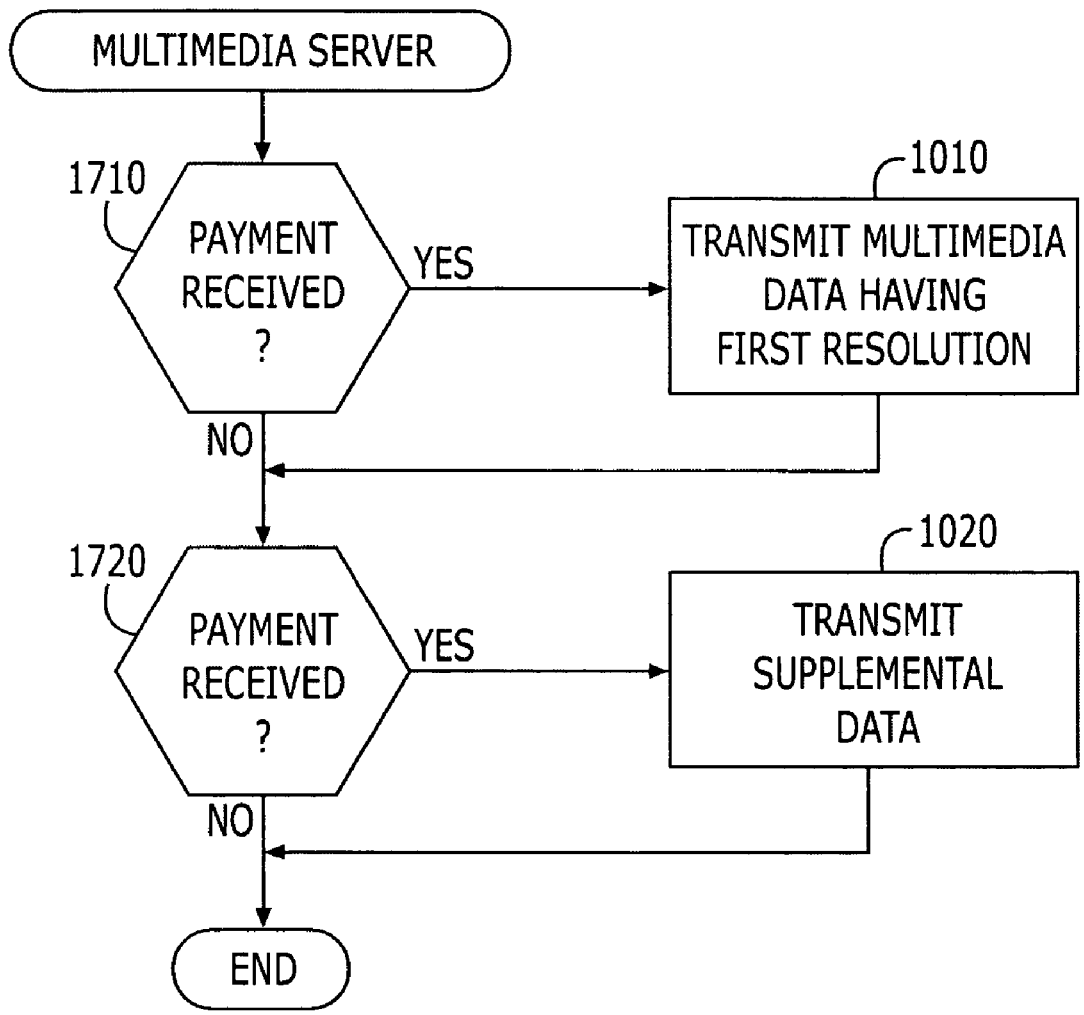

FIG. 17 is a flowchart of operations that may be performed by a multimedia server according to various embodiments of the present invention. The multimedia server may be embodied using systems and/or methods that were described in connection with FIGS. 1, 2, 5, 7, 8 and/or 9, and may be embodied in one or more server computers. As shown in FIG. 17, at Block 1710, upon receipt of payment from a multimedia client for low resolution multimedia content, the multimedia data having a first resolution is transmitted to the client (Block 1010). It will be understood that, in some embodiments, payment need not be received for the low resolution multimedia content. At Block 1720, upon receipt of payment for the high resolution multimedia content, then at Block 1020, the supplemental data is transmitted. It also will be understood that Blocks 1710 and 1720 may be performed out of the order shown in FIG. 17 and/or may partially overlap in time. Moreover, the multimedia server can comprise a streaming server and a download server, in some embodiments.

Figure 18:
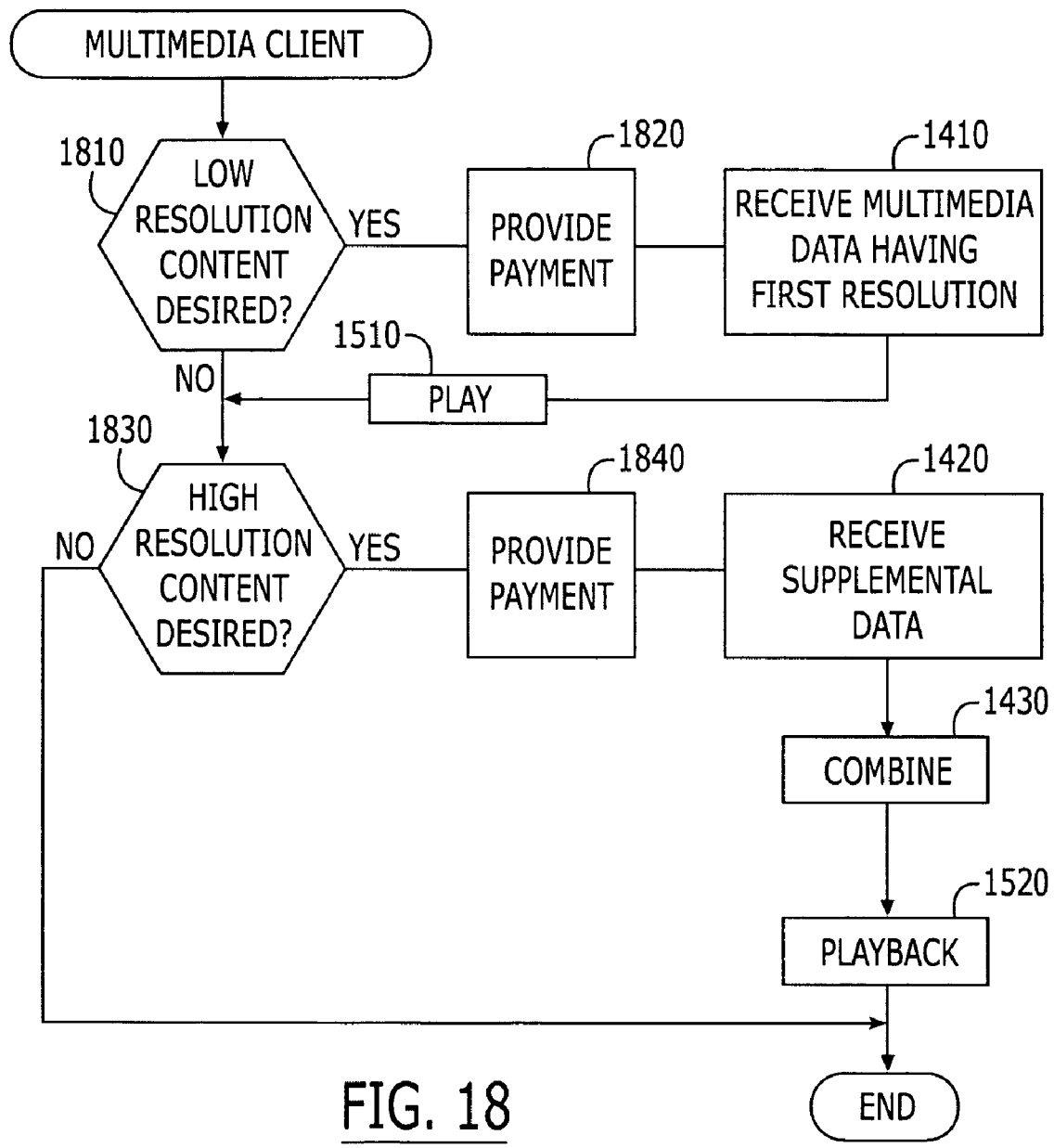

FIG. 18 is a block diagram of operations that may be performed by a multimedia client according to various embodiments of the present invention. The multimedia client may be embodied using systems and/or methods that were described in connection with FIGS. 3, 4, 6, 7, 8 and/or 9. Moreover, the multimedia client may be embodied in one or more user devices. As shown in FIG. 18, at Block 1810, if low resolution content is desired, payment may, optionally, be provided at Block 1820, and the multimedia data having a first resolution may be received at Block 1410. Optionally, at Block 1510, the low resolution multimedia content may be played. It also will be understood that payment need not be provided in some embodiments to receive the low resolution multimedia content.

Still referring to FIG. 18, at Block 1830, if the high resolution content is desired, then payment is provided at Block 1840. At Block 1420, the supplemental data is received, combined at Block 1430, and playback is performed at Block 1440, as was already described. It will be understood that the operations of Blocks 1810 and 1830 may be performed out of the sequence shown in FIG. 18, and may at least partially overlap in time. It will also be understood by those having skill in the art that combinations and subcombinations of the flowcharts of FIGS. 10-18 also may be provided according to various embodiments of the present invention, as defined by the claims.

Additional discussion of embodiments of the invention now will be provided. The deployment of wide-area wireless data infrastructure, such as Generalized Packet Radio Service (GPRS) can allow for the possibility of streamed multimedia to wireless devices, including mobile terminals. One potential problem with this type of application is the potentially limited capacity of these data networks. Widespread use of audio streaming over GPRS, for example, may quickly use up the available GPRS capacity. While this situation may improve over time, wireless data network operators may not see the excess capacity presently observed in today's wired Internet, due to the inherent radio bandwidth limits and power constraints of wireless communications.

Despite these potential limits, commercial attempts at distributing multimedia over wireless networks may be made. One approach to the potential bandwidth limitations is simply to reduce the quality of the distributed music, such as has been done with streamed audio on the wired network (e.g. RealAudio). This approach may reduce the data size of the content, which may also reduce the audio quality. Various coding schemes (MP3, ATRAC3) exist for efficiently converting recorded music into data streams. At sufficiently high data rates (e.g. about 128 kbps for MP3), the decoded audio may be virtually indistinguishable from the high-quality original recording. The data rate can be reduced, but generally with a corresponding reduction in audio quality. A number of advanced coding schemes continue to emerge (e.g. MP3Pro, ATRAC5), which can further reduce the data stream size, but significant reductions in data size may lower the quality of the decoded audio.

There are presently several approaches for providing recorded multimedia content over a wireless network. One approach is via streaming, whereby the digital data representing the multimedia content is provided in near real-time. In this approach, the average data throughput of the wireless connection generally is at least equal to the coded data rate of the multimedia content. For example, if encoding music results in 64 kbits of data per second of music, then the user's wireless data connection may need to have at least 64 kbits of average throughput. Streaming, at least when the throughput capability of the connection is not much higher than the provided data stream, also may assume that there is not a great deal of variable latency in the network, i.e., that the instantaneous throughput at any given time does not fall significantly below the average.

A typical streaming application may deal with these assumptions by reducing the data size of the streamed content (and hence the perceived quality of the decoded content) so that it can fit comfortably within the throughput capacity of the data channel, and/or by buffering the stream to mitigate the effects of variable latency. Buffering can involve initiating the data stream and storing some portion of the data in memory before decoding and generating the multimedia content signal. A typical streaming application might buffer five seconds of content before initiating near real-time playback. In this manner, the decoder can provide decoded multimedia content at a constant rate, despite the fact that the incoming data stream is arriving at a variable rate. As long as this variability is not too great, the user should not experience substantial interruptions in the decoded audio, and near real-time playback may be achieved.

Another approach for distributing multimedia content over a wireless network is the download approach. In this case, the encoded multimedia content is downloaded to the end user device as quickly as the network allows. The encoded multimedia content is stored as a file, and may be decoded and played for the user only after the download is complete. This may be the only practical approach when the encoded data stream rate exceeds the available capacity of the wireless data connection. It may also be a desired approach when providing multimedia content to a user for storage in a personal library for later access, especially since in this case the user may desire a higher quality encoding format, which may use more data than a streaming application might use. In the streaming case, the data is typically used only for the near real-time playback, and generally is not saved.

One potential problem with the download approach is that it may deny the user "instant gratification". The user typically waits until the download is completed. This process might take several minutes for a single song on a bandwidth-limited data connection. In contrast, some embodiments of the invention may allow benefits of both techniques to be combined. For example, in some embodiments, the user can quickly listen to a streamed version of the audio content, at less than perfect fidelity, and then later have access to a higher-quality version of the same content for repeated playback, without the need to completely retransmit the higher quality version.

Some embodiments of the invention employ a media encoding or compression algorithm that permits a relatively low-resolution (which can be smaller in terms of total data) version of the original multimedia content to be augmented with supplemental data in order to create a higher resolution version. One example is MP3Pro. MP3Pro files are inherently backwards compatible with MP3 decoders, since the improved resolution is provided by supplemental data in the MP3Pro datastream, which can be ignored by an MP3-only decoder that receives the MP3Pro datastream. In contrast, an MP3Pro player will use the supplemental data in the MP3Pro datastream, to provide improved sound quality.

In the MP3 example, substantial improvements in resolution and quality can result from a relatively small additional data. According to the Thomson website at mp3licensing.com, an MP3Pro file coded at 64 kbps is comparable in audio quality to a conventional MP3 file coded at >100 kbps. At the same time, that 64 kbps MP3Pro file can be decoded by a conventional MP3 decoder, albeit at significantly reduced quality. The exact figures may not be readily available, but it appears that the 64 kbps MP3Pro file includes a 56 kbps MP3 file, with the remaining 8 kbps used by the MP3Pro decoder to improve the resolution, and thereby improve the sound quality.

Other examples of coding schemes with this general property either exist, can be adapted from existing compression algorithms and/or can be developed. These coding schemes provide at least two different resolutions. For example, at least two different coding rates (i.e., compression ratios) may be provided in some embodiments, with the higher rate (lower compression) producing higher quality playback. Moreover, a higher quality file may be generated by combining a lower-quality file with supplemental data. The combination may take place by adding the additional data (in the appropriate data format), as in the MP3Pro case, or may use a more sophisticated process.

In some embodiments, the amount of additional data to convert the lower-quality file to a higher-quality version is less (and may be significantly less) than the total amount of data contained in the final higher-quality version. In the MP3Pro example from above this is clearly true: the additional 8 kbps, which is added to the original 56 kbps file, is significantly smaller than the final 64 kbps.

A digital media transmitter according to some embodiments of the invention transmits two separate sets (files or data streams) of output, the first output of which can be decoded to produce a relatively low- or moderate-quality output, the second output of which can be combined with the first output to produce a higher-quality output. A server according to some embodiments of the invention streams or downloads the first output to a network-connected user device. In some embodiments, the user device includes memory for storing the received first output and a decoder capable of decoding the first output to produce an output signal. In some embodiments, a networked user device is further capable of receiving the second output from a server, which may be the same server that provided the first output, with the decoder further capable of combining the first and second outputs, decoding, and producing an output signal of higher resolution than in the case where only the first output is decoded.

Some embodiments of the invention can provide a streaming service based on a low- to moderate-quality encoding rate appropriate for the network bandwidth. The streamed data can be decoded immediately for a near real-time experience, and can be simultaneously (or alternatively) stored in the user device's memory. In some embodiments, at some other time, the additional data can be downloaded into the device, making available a higher-quality version of the original media. The additional data can be received from the same server as the original data and/or from an alternative source. In some embodiments, the additional data can be delivered when the network capacity is available, and may be delivered in a manner that is invisible to the user. In some embodiments, with appropriate hardware and/or software, the additional data can be delivered in several portions, thus allowing the network operator to manage the delivery in accordance with network capacity constraints.

Some embodiments of the invention may provide digital-rights management schemes that can enable a variety of business models for delivering multimedia content to consumers. For example, a consumer might "buy" a music file from a service provider. In some embodiments of the invention, a moderate-quality version of the music file can be available "immediately" over a wireless connection (for example). A higher-quality version (which a typical consumer might demand) of the music file is created later, when network capacity permits.

For the MP3Pro example given above, there may be only a minimal saving of network bandwidth resulting from delivering a 56 kbps file versus the final 64 kbps version. For other schemes, the potential bandwidth savings may be larger. For example, 128 kbps MP3 may be viewed as CD-transparent quality, and may be suitable for playback in high-quality audio systems. However, 64 kbps MP3 (approximately the quality of FM radio) may be quite suitable for initial user playback, especially on a portable device. Presuming that a 128 kbps version can be created from a 64 kbps version by later adding something on the order of 64 kbps, there can be potential advantages in deferring a portion of the data transmission in a bandwidth-limited network.

It will be understood that, as used herein, the term "decoder" is not limited to the conversion of a coded media file to an output signal, but may include file management, the ability to combine the two sets of data described herein, the ability to manage streaming and/or playback of stored files, etc. Also, as used herein, the term "server" is not limited to a personal computer or similar device connected to a network at a fixed location. The playing devices described herein might also be equipped with a "server" function, which can permit a distributed or peer-to-peer topology for the distribution of the files described herein.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A multimedia distributing method comprising:
   transmitting by a transmitter multimedia data having a first resolution; and
   separately transmitting by a transmitter supplemental data, which, when combined by a programmed computer processor with the multimedia data having a first resolution, provides multimedia content at a second resolution that is higher than the first resolution,
   wherein transmitting multimedia data is performed in real or near real-time, and
   wherein separately transmitting supplemental data is not performed in real or near real-time;
   wherein the first resolution comprises a first sampling frequency, a first compression ratio, a first frequency range, a first number of bits of resolution, a first distortion level, a first number of pixels, a first frame rate, a first number of colors and/or a first coding rate; and
   wherein the second resolution comprises, respectively, a second sampling frequency that is higher than the first sampling frequency, a second compression ratio that is lower than the first compression ratio, a second frequency range that is wider than the first frequency range, a second number of bits of resolution that is greater than the first number of bits of resolution, a second distortion level that is lower than the first distortion level, a second number of pixels that is greater than the first number of pixels, a second frame rate that is greater than the first frame rate, a second number of colors that is greater than the first number of colors and/or a second coding rate that is higher than the first coding rate.

2. A method according to claim 1 wherein transmitting multimedia data and separately transmitting supplemental data are at least partially separated in transmission space, channel and/or medium.

3. A method according to claim 1
   wherein transmitting multimedia data comprises streaming multimedia data having a first resolution; and
   wherein separately transmitting supplemental data comprises downloading supplemental data, which, when combined with the multimedia data having a first resolution, provides the multimedia content at a second resolution that is higher than the first resolution.

4. A method according to claim 1 wherein the supplemental data is of a first size and wherein the multimedia content at the second resolution is of a second size that is larger than the first size.

5. A method according to claim 1:
   wherein transmitting multimedia data is subject to a first digital rights management scheme; and
   wherein separately transmitting supplemental data is subject to a second digital rights management scheme that is different from the first digital rights management scheme.

6. A method according to claim 1:
   wherein separately transmitting supplemental data is preceded by receiving payment for the supplemental data that is greater than payment that is received for the multimedia data having a first resolution.

7. A method according to claim 1:
   wherein transmitting multimedia data is performed from a first multimedia server; and
   wherein separately transmitting supplemental data is performed from a second multimedia server that is different from the first multimedia server.

8. A method according to claim 1:
   wherein transmitting multimedia data is performed using a wireless network; and
   wherein separately transmitting supplemental data is performed using a wired network.

9. A method of transmitting a multimedia work comprising:
   streaming by a computer network a first portion of the multimedia work; and
   downloading by a computer network a second portion of the multimedia work, wherein the first and second portions when combined together comprise the multimedia work;
   wherein streaming comprises streaming multimedia data at a first resolution;
   wherein downloading comprises downloading supplemental data, which, when combined with the multimedia data at a first resolution, provides the multimedia work at a second resolution that is higher than the first resolution;
   wherein the first resolution comprises a first sampling frequency, a first compression ratio, a first frequency range, a first number of bits of resolution, a first distortion level, a first number of pixels, a first frame rate, a first number of colors, a first number of channels and/or a first coding rate; and
   wherein the second resolution comprises, respectively, a second sampling frequency that is higher than the first sampling frequency, a second compression ratio that is lower than the first compression ratio, a second frequency range that is wider than the first frequency range, a second number of bits of resolution that is greater than the first number of bits of resolution, a second distortion level that is lower than the first distortion level, a second number of pixels that is greater than the first number of pixels, a second frame rate that is greater than the first frame rate, a second number of colors that is greater than the first number of colors, a second number of channels that is greater than the first number of channels and/or a second coding rate that is higher than the first coding rate.

10. A method according to claim 9 wherein streaming and downloading are at least partially separated in transmission time, space, channel and/or medium.

11. A method according to claim 9:
wherein streaming is subject to a first digital rights management scheme; and
wherein downloading is subject to a second digital rights management scheme that is different from the first digital rights management scheme.

12. A method according to claim 9:
wherein downloading is preceded by receiving payment for the supplemental data that is greater than payment that is received for the streaming.

13. A method according to claim 9:
wherein streaming is performed from a first multimedia server; and
wherein downloading is performed from a second multimedia server that is different from the first multimedia server.

14. A method according to claim 9:
wherein streaming is performed using a wireless network; and
wherein downloading is performed using a wired network.

15. A multimedia playing method comprising:
receiving by a receiver multimedia data having a first resolution;
separately receiving by a receiver supplemental data, which, when combined with the multimedia data having a first resolution, provides multimedia content at a second resolution that is higher than the first resolution;
combining by a programmed computer processor the multimedia data having a first resolution and the supplemental data to provide the multimedia content at a second resolution that is higher than the first resolution; and
playing the multimedia content at a second resolution that is higher than the first resolution,
wherein receiving multimedia data is performed in real or near real-time, and
wherein separately receiving supplemental data is not performed in real or near real-time.

16. A method according to claim 15 further comprising:
playing the multimedia data at the first resolution.

17. A method according to claim 16 wherein playing the multimedia data at the first resolution is performed prior to playing the multimedia content at the second resolution that is higher than the first resolution.

18. A method according to claim 15 wherein receiving, separately receiving, combining and playing are performed in a single user device.

19. A method according to claim 15 wherein receiving multimedia data and separately receiving supplemental data are at least partially separated in originating space, receiving channel and/or medium.

20. A method according to claim 15:
wherein receiving multimedia data comprises receiving streaming multimedia data having a first resolution; and
wherein separately receiving supplemental data comprises downloading supplemental data, which, when combined with the multimedia data having a first resolution, provides the multimedia content at a second resolution that is higher than the first resolution.

21. A method according to claim 15:
wherein the first resolution comprises a first sampling frequency, a first compression ratio, a first frequency range, a first number of bits of resolution, a first distortion level, a first number of pixels, a first frame rate, a first number of colors and/or a first coding rate; and
wherein the second resolution comprises, respectively, a second sampling frequency that is higher than the first sampling frequency, a second compression ratio that is lower than the first compression ratio, a second frequency range that is wider than the first frequency range, a second number of bits of resolution that is greater than the first number of bits of resolution, a second distortion level that is lower than the first distortion level, a second number of pixels that is greater than the first number of pixels, a second frame rate that is greater than the first frame rate, a second number of colors that is greater than the first number of colors and/or a second coding rate that is higher than the first coding rate.

22. A method according to claim 15 wherein the supplemental data is of a first size and wherein the multimedia content at the second resolution is of a second size that is larger than the first size.

23. A method according to claim 15:
wherein receiving multimedia data is subject to a first digital rights management scheme; and
wherein separately receiving supplemental data is subject to a second digital rights management scheme that is different from the first digital rights management scheme.

24. A method according to claim 15:
wherein separately receiving supplemental data is preceded by providing payment for the supplemental data that is greater than payment that is provided for the multimedia data having a first resolution.

25. A method according to claim 15:
wherein receiving multimedia data is performed using a wireless network; and
wherein separately receiving supplemental data is performed using a wired network.

26. A method of playing a multimedia work comprising:
streaming by a computer network a first portion of the multimedia work;
downloading by a computer network a second portion of the multimedia work;
combining by a programmed computer processor the first and second portions of the multimedia work to generate the multimedia work; and
playing the multimedia work that is generated;
wherein streaming comprises streaming the multimedia work at a first resolution;
wherein downloading comprises downloading supplemental data, which, when combined with the multimedia work at a first resolution, provides the multimedia work at a second resolution that is higher than the first resolution;
wherein the combining comprises combining the multimedia work at a first resolution and the supplemental data to generate the multimedia work at the second resolution;
wherein playing comprises playing the multimedia work at the second resolution;
wherein the first resolution comprises a first sampling frequency, a first compression ratio, a first frequency range, a first number of bits of resolution, a first distortion level, a first number of pixels, a first frame rate, a first number of colors, a first number of channels and/or a first coding rate; and
wherein the second resolution comprises, respectively, a second sampling frequency that is higher than the first sampling frequency, a second compression ratio that is lower than the first compression ratio, a second frequency range that is wider than the first frequency range, a second number of bits of resolution that is greater than the first number of bits of resolution, a second distortion level that is lower than the first distortion level, a second number of pixels that is greater than the first number of pixels, a second frame rate that is greater than the first frame rate, a second number of colors that is greater than the first number of colors, a second number of channels that is greater than the first number of channels and/or a second coding rate that is higher than the first coding rate.

27. A method according to claim 26 further comprising: playing the multimedia work at the first resolution.

28. A method according to claim 27 wherein playing the multimedia work at the first resolution is performed prior to playing the multimedia work at the second resolution that is higher than the first resolution.

29. A method according to claim 26 wherein streaming, downloading, combining and playing are performed in a single user device.

30. A method according to claim 26 wherein streaming and downloading are at least partially separated in receiving time, originating space, receiving channel and/or medium.

31. A method according to claim 26:
wherein streaming is subject to a first digital rights management scheme; and
wherein downloading is subject to a second digital rights management scheme that is different from the first digital rights management scheme.

32. A method according to claim 26:
wherein downloading is preceded by providing payment for the second portion that is greater than payment that is provided for the first portion.

33. A method according to claim 26:
wherein streaming is performed using a wireless network; and
wherein downloading is performed using a wired network.

34. A multimedia distribution system comprising:
an encoder that is responsive to input multimedia content and that is configured to encode the input multimedia content at a first resolution and to generate supplemental data, which, when combined with the input multimedia content that is encoded at a first resolution, provides the input multimedia content encoded at a second resolution that is higher than the first resolution; and
a transmitter that is responsive to the encoder and that is configured to separately transmit the input multimedia content that is encoded at a first resolution and the supplemental data,
wherein the transmitter is configured to transmit the input multimedia content that is encoded at a first resolution in real or near real-time and to separately transmit the supplemental data in other than real or near real-time.

35. The system according to claim 34 wherein the transmitter is configured to separately transmit the input multimedia content that is encoded at a first resolution and the supplemental data at least partially separated in transmission time, space, channel and/or media.

36. A system according to claim 34 wherein the transmitter is further configured to stream the input multimedia content that is encoded at a first resolution and to download the supplemental data.

37. A system according to claim 34:
wherein the first resolution comprises a first sampling frequency, a first compression ratio, a first frequency range, a first number of bits of resolution, a first distortion level, a first number of pixels, a first frame rate, a first number of colors and/or a first coding rate; and
wherein the second resolution comprises, respectively, a second sampling frequency that is higher than the first sampling frequency, a second compression ratio that is lower than the first compression ratio, a second frequency range that is wider than the first frequency range, a second number of bits of resolution that is greater than the first number of bits of resolution, a second distortion level that is lower than the first distortion level, a second number of pixels that is greater than the first number of pixels, a second frame rate that is greater than the first frame rate, a second number of colors that is greater than the first number of colors and/or a second coding rate that is higher than the first coding rate.

38. A system according to claim 34 wherein the transmitter is configured to transmit the input multimedia content that is encoded at a first resolution subject to a first digital rights management scheme and to separately transmit the supplemental data subject to a second digital rights management scheme that is different from the first digital rights management scheme.

39. A system according to claim 34 wherein the transmitter is configured to separately transmit the supplemental data in response to receiving payment for the supplemental data that is greater than payment that is received for the input multimedia content that is encoded at a first resolution.

40. A system according to claim 34 wherein the transmitter comprises:
a first multimedia server that is configured to transmit the input multimedia content that is encoded at a first resolution; and
a second multimedia server that is configured to transmit the supplemental data.

41. A system for transmitting a multimedia work comprising:
a streaming server that is configured to transmit a first portion of the multimedia work; and
a downloading server that is configured to transmit a second portion of the multimedia work, wherein the first and second portions together comprise the multimedia work;
wherein the streaming server is configured to stream multimedia data at a first resolution;
wherein the downloading supplemental mental data which, when combined with the multimedia data at a first resolution, provides the multimedia work at a second resolution that is higher than the first resolution;
wherein the first resolution comprises a first sampling frequency, a first compression ratio, a first frequency range, a first number of bits of resolution, a first distortion level, a first number of pixels, a first frame rate, a first number of colors, a first number of channels colors and/or a first coding rate; and
wherein the second resolution comprises, respectively, a second sampling frequency that is higher than the first sampling frequency, a second compression ratio that is lower than the first compression ratio, a second frequency range that is wider than the first frequency range, a second number of bits of resolution that is greater than the first number of bits of resolution, a second distortion level that is lower than the first distortion level, a second number of pixels that is greater than the first number of pixels, a second frame rate that is greater than the first frame rate, a second number of colors that is greater than the first number of colors, a second number of channels that is greater than the first number of channels and/or a second coding rate that is higher than the first coding rate.

42. A system according to claim 41:
wherein the streaming server is configured to transmit the first portion of the multimedia work subject to a first digital rights management scheme; and
wherein the downloading server is configured to transmit the second portion of the multimedia work subject to a second digital rights management scheme that is different from the first digital rights management scheme.

43. A system according to claim 41:
wherein the downloading server is configured to transmit the second portion of the multimedia work subject to receiving payment for the second portion that is greater than payment that is received for the first portion.

44. A multimedia playing system comprising:
a receiver that is configured to receive multimedia data having a first resolution and to separately receive supplemental data, which, when combined with the multimedia data having a first resolution, provides multimedia content at a second resolution that is higher than the first resolution;
a processor that is configured to combine the multimedia data having a first resolution and the supplemental data to provide the multimedia content at a second resolution that is higher than the first resolution; and
a multimedia transducer that is configured to play the multimedia content at a second resolution that is higher than the first resolution,
wherein the receiver is configured to receive the input multimedia content that is encoded at a first resolution in real or near real-time and to separately receive the supplemental data in other than real or near real-time.

45. A system according to claim 44 wherein the multimedia transducer is further configured to play the multimedia data having a first resolution.

46. A system according to claim 44 wherein the supplemental data is at least partially separated from the multimedia data having a first resolution in originating space, receiving channel and/or medium.

47. A system according to claim 44:
wherein the receiver is further configured to stream the multimedia data having a first resolution and download the supplemental data.

48. A system according to claim 44:
wherein the first resolution comprises a first sampling frequency, a first compression ratio, a first frequency range, a first number of bits of resolution, a first distortion level, a first number of pixels, a first frame rate, a first number of colors and/or a first coding rate; and
wherein the second resolution comprises, respectively, a second sampling frequency that is higher than the first sampling frequency, a second compression ratio that is lower than the first compression ratio, a second frequency range that is wider than the first frequency range, a second number of bits of resolution that is greater than the first number of bits of resolution, a second distortion level that is lower than the first distortion level, a second number of pixels that is greater than the first number of pixels, a second frame rate that is greater than the first frame rate, a second number of colors that is greater than the first number of colors and/or a second coding rate that is higher than the first coding rate.

49. A system according to claim 44:
wherein the receiver is further configured to receive the multimedia data having a first resolution subject to a first digital rights management scheme and to separately receive the supplemental data subject to a second digital rights management scheme that is different from the first digital rights management scheme.

50. A system according to claim 44:
wherein the receiver is configured to separately receive the supplemental data subject to providing payment for the supplemental data that is greater than payment that is provided for the multimedia data having a first resolution.

51. A system for playing a multimedia work comprising:
a receiver that is configured to stream a first portion of the multimedia work and to download a second portion of the multimedia work;
a processor that is configured to combine the first and second portions of the multimedia work to generate the multimedia work; and
a multimedia transducer that is configured to play the multimedia work that is generated;
wherein the receiver is configured to stream the multimedia work at a first resolution and to download the second portion as supplemental data, which, when combined with the first portion, provides the multimedia work at a second resolution that is higher than the first resolution;
wherein the processor is configured to combine the multimedia work at a first resolution and the supplemental data to generate the multimedia work at the second resolution;
wherein the multimedia transducer is configured to play the multimedia work at the second resolution;
wherein the first resolution comprises a first sampling frequency, a first compression ratio, a first frequency range, a first number of bits of resolution, a first distortion level, a first number of pixels, a first frame rate, a first number of colors, a first number of channels colors and/or a first coding rate; and
wherein the second resolution comprises, respectively, a second sampling frequency that is higher than the first sampling frequency, a second compression ratio that is lower than the first compression ratio, a second frequency range that is wider than the first frequency range, a second number of bits of resolution that is greater than the first number of bits of resolution, a second distortion level that is lower than the first distortion level, a second number of pixels that is greater than the first number of pixels, a second frame rate that is greater than the first frame rate, a second number of colors that is greater than the first number of colors, a second number of channels that is greater than the first number of channels and/or a second coding rate that is higher than the first coding rate.

52. A system according to claim 51 wherein the multimedia transducer is further configured to play the multimedia work at the first resolution.

53. A system according to claim 52 wherein the multimedia transducer is further configured to play the multimedia work at the first resolution prior to playing the multimedia work at the second resolution that is higher than the first resolution.

54. A system according to claim 51 wherein the first and second portions of the multimedia work are at least partially separated in receiving time, originating space, receiving channel and/or medium.

55. A system according to claim 51:
- wherein the receiver is configured to stream the first portion subject to a first digital rights management scheme; and
- wherein the receiver is configured to download the second portion subject to a second digital rights management scheme that is different from the first digital rights management scheme.

56. A system according to claim 51:
- wherein the receiver is configured to download the second portion subject to payment for the second portion that is greater than payment that is provided for the first portion.

* * * * *

UNITED STATES PATENT AND TRADEMARK OFFICE
CERTIFICATE OF CORRECTION

| | | |
|---|---|---|
| PATENT NO. | : 7,830,965 B2 | Page 1 of 1 |
| APPLICATION NO. | : 10/757247 | |
| DATED | : November 9, 2010 | |
| INVENTOR(S) | : Homiller | |

It is certified that error appears in the above-identified patent and that said Letters Patent is hereby corrected as shown below:

<u>On Title Page:</u>
Item (74) Attorney, Agent, or Firm: Please correct "Sibley & Sibley"
             to read -- Sibley & Sajovec --

<u>In the Claims:</u>
Column 13, Claim 3, Line 55: Please correct "claim 1" to read -- claim 1: --

Column 18, Claim 41, Line 52: Please correct "supplemental mental data,"
             to read -- server is configured to download
             supplemental data --

Signed and Sealed this
Tenth Day of May, 2011

David J. Kappos
*Director of the United States Patent and Trademark Office*